(12) United States Patent
Duffell et al.

(10) Patent No.: US 7,757,091 B2
(45) Date of Patent: Jul. 13, 2010

(54) METHOD AND APPARATUS FOR THE CREATION OF A SELF-AUTHENTICATING DOCUMENT

(75) Inventors: John Duffell, East Sussex (GB); Laurence O'Toole, Galway (IE); Thomas Martin, Galway (IE)

(73) Assignee: Abathorn Limited, Edinburgh (GB)

( * ) Notice: Subject to any disclaimer, the term of this patent is extended or adjusted under 35 U.S.C. 154(b) by 1194 days.

(21) Appl. No.: 10/476,810

(22) PCT Filed: May 3, 2002

(86) PCT No.: PCT/GB02/02059
§ 371 (c)(1),
(2), (4) Date: Apr. 14, 2004

(87) PCT Pub. No.: WO02/091730
PCT Pub. Date: Nov. 14, 2002

(65) Prior Publication Data
US 2004/0169366 A1    Sep. 2, 2004

(30) Foreign Application Priority Data
May 4, 2001    (GB)    ................... 0111063.4

(51) Int. Cl.
| H04L 9/32 | (2006.01) |
| H04L 29/06 | (2006.01) |
| H04L 9/00 | (2006.01) |
| H04L 9/28 | (2006.01) |
| G06F 12/14 | (2006.01) |
| G06F 7/04 | (2006.01) |
| G06F 11/00 | (2006.01) |
| H04N 1/44 | (2006.01) |
| H04K 1/00 | (2006.01) |
| G01R 31/28 | (2006.01) |
| H03M 13/00 | (2006.01) |

(52) U.S. Cl. .................. 713/179; 713/161; 713/167; 713/168; 713/176; 713/181; 713/187; 726/26; 380/245; 380/246; 380/255; 380/267; 380/28; 714/100; 714/728; 714/756; 714/758; 714/784

(58) Field of Classification Search ................. 713/179, 713/161, 167, 168, 176, 181, 187; 726/26; 380/245, 246, 255, 267, 28; 714/100, 728, 714/756, 758, 784
See application file for complete search history.

(56) References Cited

U.S. PATENT DOCUMENTS
4,413,339 A * 11/1983 Riggle et al. ................. 714/765

(Continued)

FOREIGN PATENT DOCUMENTS
EP    0541262 A    5/1993

(Continued)

OTHER PUBLICATIONS

Harry Newton, Newton's Telecom Dictionary, 1998, Telecom Books, 14th Edition, p. 630.*

(Continued)

*Primary Examiner*—Aravind K Moorthy

(57) ABSTRACT

A self-authenticating printed document (101) comprises text and a symbol (102) printed on the document (101). The symbol (102) includes a verification value, which is representative of the entire data content of the text, and error correction codes for correcting the text. The verification value is used to check the integrity of the text after the document has been corrected using the error correction codes.

18 Claims, 5 Drawing Sheets

U.S. PATENT DOCUMENTS

| | | | |
|---|---|---|---|
| 5,428,630 A * | 6/1995 | Weng et al. | 714/763 |
| 5,432,506 A | 7/1995 | Chapman | |
| 5,765,176 A | 6/1998 | Bloomberg | |
| 5,912,974 A * | 6/1999 | Holloway et al. | 380/51 |
| 6,170,744 B1 | 1/2001 | Lee et al. | |
| 2007/0110235 A1 * | 5/2007 | Pruitt et al. | 380/54 |
| 2007/0150739 A1 * | 6/2007 | Masui | 713/178 |
| 2007/0194129 A1 * | 8/2007 | Jones | 235/491 |

FOREIGN PATENT DOCUMENTS

| | | |
|---|---|---|
| EP | 0862318 A | 9/1998 |
| GB | 2278002 A | 11/1994 |
| WO | WO 01/03077 A1 | 1/2001 |
| WO | WO 01/15382 A | 3/2001 |

OTHER PUBLICATIONS

PCT International Search Report for PCT/GB02/02059 dated Aug. 1, 2002.

Search Report for corresponding GB 0111063.4, completed May 2, 2002 by the GB Patent Office.

* cited by examiner

METHOD AND APPARATUS FOR THE CREATION OF A SELF-AUTHENTICATING DOCUMENT

The present invention relates to a method and apparatus for the creation of a self-authenticating printed document having the inherent capability that the total content of the document can be authenticated at any time solely by reference to the document itself. This authentication is performed to detect if any change has been made to the document.

The rate of growth of world economies is significantly exceeded by the pace at which fraud is increasing and many different types of documents are susceptible to fraudulent manipulation of and change to the information printed on the document. A substantial proportion of this fraudulent activity is associated with paper documents and considerable effort has been directed to developing various methods to produce secure paper to counteract this, such as watermarking, and holograms, security overprinting, etc. However, the use of specially secured paper may often not be practical or cost justifiable. In any case, it is the information printed on the paper which needs to be secured.

Since virtually all printed information today is generated through some kind of computer system, there now exists the possibility of utilising and extending to the printed document the information security techniques employ in the electronic environment, where info-security has spiralled with the development of cryptographic systems, private/public key infrastructures, digital signatures, trusted third parties, digital certificates, etc.

The barrier to transporting any of these electronic techniques to the printed paper document has been the need to effect printing and scanning without the imperfections that these processes introduce in crossing the electronic/physical boundary. In particular, the movement of data from the printed page into the electronic digital domain is extremely unlikely to be achieved without channel noise occurring in the analogue process of printing, document handling and scanning required.

By way of elaboration, there are three essentially different types of change that can exist in recovered text: errors, insertions and deletions. These can frequently arise from noise resulting from the printing and processes, from shortcomings inherent in OCR software and from physical changes to the printed document.

An error is what happens if a character in the original text becomes a different character in the scanned text, for whatever reason. The OCR may read an "O" as a "0", or it may confuse "I" and "1", or someone may alter a "3" to be an "8" etc.

An insertion is what is referred to whenever an extra character appears in the scanned document that was not in the original. "m" may be scanned as "rn", or someone may insert an extra "0" into the text etc.

A deletion is the opposite of an insertion. For whatever reason there is one character missing from the scanned file that is in the original text. The letters "rn" may be misinterpreted as an "m", the OCR may overlook a "," or a ".".

Errors, insertions and deletions are not mutually exclusive. In fact, an insertion as a result of the OCR usually means an insertion and an error in the same word. For example, if the word "farmyard" is read as "farrnyard" then not only is there an extra character (the n should not be there) but the second "r" is an error because that letter should be an "m".

The invariable result of any type of such change is a degree of bit imperfection, which has rendered known electronic security functions inoperable. The improvements in scanner quality and OCR software have constantly been reducing the incidence of change resulting from noise in the process but without eradicating the problem.

As a consequence, attempts to resolve authentication of printed documents have been limited to taking selected items of data from the document and encoding these on the document in machine readable code for subsequent scanning, as described in the following patent specifications:

EP 0699 327 (Fouracres and Douglas), which discloses a security system in which verification of so-called bearer documents such as cheques, bonds, stocks, etc. where value is determined by critical data items such as expiry dates, monetary amounts, beneficiary identity printed on them may be secured by printing such key items of data encoded into machine readable code and also printed on the document. The disclosed invention functions most easily with templated documents and where the data can be visually compared for verification. Automated comparison could also be effected with use of OCR equipment for templated documents. However, the coding of all the information on a sizable freeform document by this method has practical drawbacks, and does not easily allow automated scanning, comparison and verification.

U.S. Pat. No. 6,170,744 (Lee and Meadow), which discloses a self-authenticating document which uses a hash value in a symbol creation process and then uses a public key to decrypt data of the self-authenticated document. The invention relates to self-authenticating negotiable documents, such as cheques in which a self-contained closed loop system is provided to ensure the integrity and authenticity of the negotiable documents. Such documents are templated and the ability to extend this cover freeform text documents is not attempted.

The above systems suffer from limitations; either the documents involved have to conform to a specific common format so that the key data can be selected automatically or there needs to be some human intervention in the process to identify which items of information are critical. Additionally the amount of data that can be carried practically in machine-readable code presents limitations in such systems.

U.S. Pat. No. 5,432,506 (Chapman) discloses a counterfeit document detection system in which a secret program selects certain characters written or already on the document, and transforms them into a string of characters to print on the document as a unique code. While this system may increase the chance of detecting data modification, it is not able to detect all such changes using only key data points spaced sporadically around the document as checkpoints.

Checksumming methods are employed in many inventions which operate entirely in the electronic domain such as disclosed in EP 94095 and JP 11261550.

Error correction techniques are similarly frequently used in imaging inventions such as in JP 2000259618 for error correction to character images, or as in U.S. Pat. No. 5,920,878 for marking a copyright notice or indicia of authorship in electronic documents.

The use of devices which cryptographically certify the authenticity of electronic documents is widespread examples being disclosed in U.S. Pat Nos. 5,189,700; 5,136,643; 5,136,647; and 5,001,752. These disclose methods where, after data has been inputted in digital form, cryptographic certification can be applied using hashing techniques. Extension of these inventions to encompass paper documents is in no case envisaged, as the necessary process of scanning paper documents to generate a digital representation would require what has been perceived as being too complex, costly and impractical.

The conclusion that the digitisation of a paper document produced for verification cannot achieve exact correspondence with the original electronic form of the digital document has been generally accepted. In consequence, there remains a need for a system which can straightforwardly be applied at document creation time to ensure that the document when printed contains additional information which will enable the totality of the document to be authenticated from the paper document itself.

Intentional unauthorized alteration to the paper document, which may be for fraudulent purposes, would typically involve word deletions, word additions or word changes. This generally involves several consecutive character changes in what is similar to a burst error—which can occur accidentally as a result of physical changes to the paper document. This is distinctly different to the channel noise deletions, additions and errors which affect only one of two characters but can happen throughout the document.

For the avoidance of doubt, changes can occur in three principal domains: in the electronic domain, in the physical (i.e. printed) domain or at the interface between the two (i.e. when the document is being transferred between the electronic and physical domains by printing or scanning, for example). Changes in the electronic domain can result from human or machine error or deliberate human action, changes in the physical domain normally result from deliberate or accidental human action and changes at the interfaces normally result from channel noise, as discussed above.

It is an object of the present invention to provide a method for producing self-authenticable paper documents with the capability of applying security techniques available in the electronic domain to the verification of the total document content. The invention seeks to identify all types of change arising in both domains identified above and at the interfaces between the domains.

Accordingly, a first aspect of the present invention provides a method of producing a document comprising: (i) providing text which is intended to be contained within the document, (ii) generating a text verification value, representative of the entire content of the said text; (iii) generating one or more error correction codes for the said text; and (iv) generating a machine-readable symbol, representative of the said text verification value and the said error correction code or codes; wherein the symbol is adapted for incorporation within the document when it is printed.

The method may comprise the further step of printing the said document in such a manner that it comprises the said text and the said symbol.

It is particularly preferred that the said verification value comprises a hash total.

The said verification value preferably comprises a checksum.

In one particularly preferred embodiment, the said text is divided into a predetermined number of strings and an error correction code is determined for each respective string.

The or each said error correction code may be a Reed-Solomon code.

The said symbol may comprise security data.

A further aspect of the invention provides a method of verifying a printed document, comprising: (i) machine-reading text and a symbol printed on the document; (ii) deriving one or more error correction codes from the said symbol; (iii) using the error correction code or codes to perform an error correction operation on the said text; (iv) deriving a verification value representative of the entire content of a predetermined body of text from the said symbol; (v) deriving a further verification value from the said text after it has been subjected to the correction operation; and (vi) comparing the said further verification value with the said verification value derived from the said symbol.

The said text and symbol may be read using an optical scanner.

Preferably, the said verification value comprises a hash total.

The said verification value preferably comprises a checksum.

It is particularly preferred that the text is divided into a series of strings and a said error correction code is associated with each respective said string.

The or each said error correction code may be a Reed-Solomon code.

It is particularly preferred that the said symbol comprises security and the said method comprises a step of using the said security data in order to extract information contained within the said symbol.

According to a third aspect of the invention, there is provided a self-authenticating printed document comprising a body of text and a machine-readable symbol, wherein the said symbol comprises a verification value and one or more error correction codes, the said verification value being representative of the entire data content of the said body of text and the error correction code or codes being adapted for correcting the said text after it has been read by a machine.

Preferably, the said verification value comprises a hash total.

In a particularly preferred embodiment, the said verification value comprises a checksum.

The or each said error correction code may be a Reed-Solomon code.

It is particularly preferred that the said symbol comprises security data.

A fourth aspect of the invention provides a device for producing a self-authenticating document, the said device being adapted to provide text to be recorded on the said document; to generate a text verification value representative of the entire content of the said text; to generate one or more error correction codes for correcting the said text after it has been read by a machine; and to generate a machine-readable symbol representative of the said text verification value and the said error correction code or codes, which symbol is adapted to be incorporated in the document when it is printed.

Preferably, the device comprises a printer.

A fifth aspect of the invention provides a device for verifying a self-authenticating document, the said device being adapted to receive text and a symbol contained within the said document, to derive one or more error correction codes from the said symbol, to apply a correction operation to the said text using the said error correction code or codes, to derive a verification value representative of the entire content of a predetermined body of text from the said symbol, to derive a further verification value from the said received text after it has been subjected to the said error correction procedure, and to compare the said verification value with the said further verification value.

Preferably, the device comprises an optical scanner.

Thus an embodiment of the invention can enable the authentication and verification of the totality of a document when it is printed on paper, by reference solely to the paper document.

Embodiments of the invention utilise checksumming/hash totalling techniques, to which additional cryptography can optionally be applied, in conjunction with appropriate levels of error correction coding, which is developed from the text data. In such a case, both the hash total and the error correction coding are incorporated in a machine readable code and printed on the document concurrently with the document text content. The machine-readable code preferably itself has error correction protection.

Embodiments of the invention also provide methods which enable an assessment to be made of the level of error correction that will be selected for any given application to be commensurate with both the physical apparatus used specifically for that application and the degree of security deemed appropriate.

Embodiments of the invention particularly enable the above-mentioned objects and other advantages of the invention to be achieved and optionally enhanced by a method of transporting any additional security features employed in the electronic domain into the paper document. For example, digital signatures can be incorporated into a machine readable symbol printed on a paper document, which can cryptographically protect a hash total and error coding also embodied in the symbol. This enables security to be transferred back to the electronic domain when the paper document is read by a scanning device, to be utilised then or later. The use of a security technique, such as Private Public Key (PPK) pair methodology,: is optional; the only security element that is mandatory is the step of generating a text verification value representative of the text data in the document and including this in the machine readable symbol, which may be printed on the paper document concurrently with the human readable text. Additional electronic security features, known to those skilled in the art, may also be incorporated into the symbol.

The above-mention advantages of the invention result at least partly from utilising an error correction code, such as Reed-Solomon, to resolve any data imperfection that may occur when text data and symbols are transferred from the electronic domain to the physical world and back again. When printing and scanning devices are employed in conjunction with OCR software, errors can occur which would render useless the application of checksum comparisons which require bit perfection. An embodiment of the invention therefore allows creating error correction modules in a computing device prior to printing of a paper document. These error correction modules can then be incorporated into the same machine-readable symbols that include hash totalling, together with any additional security features.

The above-mentioned objects and other advantages of the invention may be achieved by a method for verification of such self-authenticating documents. This procedure preferably involves scanning the document, both text data and symbol, into a computing device. The symbol, which itself may be protected by integral error correction coding, is then divided into its component elements of the error correction modules, the hash total of the text data and any optional additional security features. The step of applying the error correction module to the scanned text data can then be performed. The corrected text data can then be hash totalled and then compared with the hash total retrieved from the symbol and thus the document is either authenticated or contains some change that has been effected to the text data printed on the document, over and above the channel noise errors introduced in the printing, document handling and scanning processes.

If the additional security features that can optionally be applied have been used to cryptographically protect the document, a step to decrypt or check digital signing may be necessary prior to the above described method to compare the hash totalling.

The above-mentioned objects and other advantages of the invention may be facilitated for application of the invention in any particular physical configuration with the appropriate level of security deemed necessary by utilising the method of the invention to provide statistical information allowing the type and level of error correction that will be utilised to be assessed.

Embodiments of the invention will now be described by way of example and with reference to the accompanying drawings in which.

The invention is generic in nature and capable of being manifested in various applications. Embodiments provide the ability to generate a self-authenticating text data document on paper, so that at any later stage that paper document is capable of being authenticated against fraudulent change. The invention can be operated in 'stand-alone' mode or incorporated as an extension to an e-messaging system operating on the internet or over a Local Area Network; alternatively it can be embodied into e-business applications to provide an interface with paper based legacy systems or to provide paper auditing capabilities or whenever an application needs to produce paper documents that can be authenticated. This breadth of potential embodiments is catered for by a range of optional steps and facilities falling within the overall scope of the invention.

Figure 1:
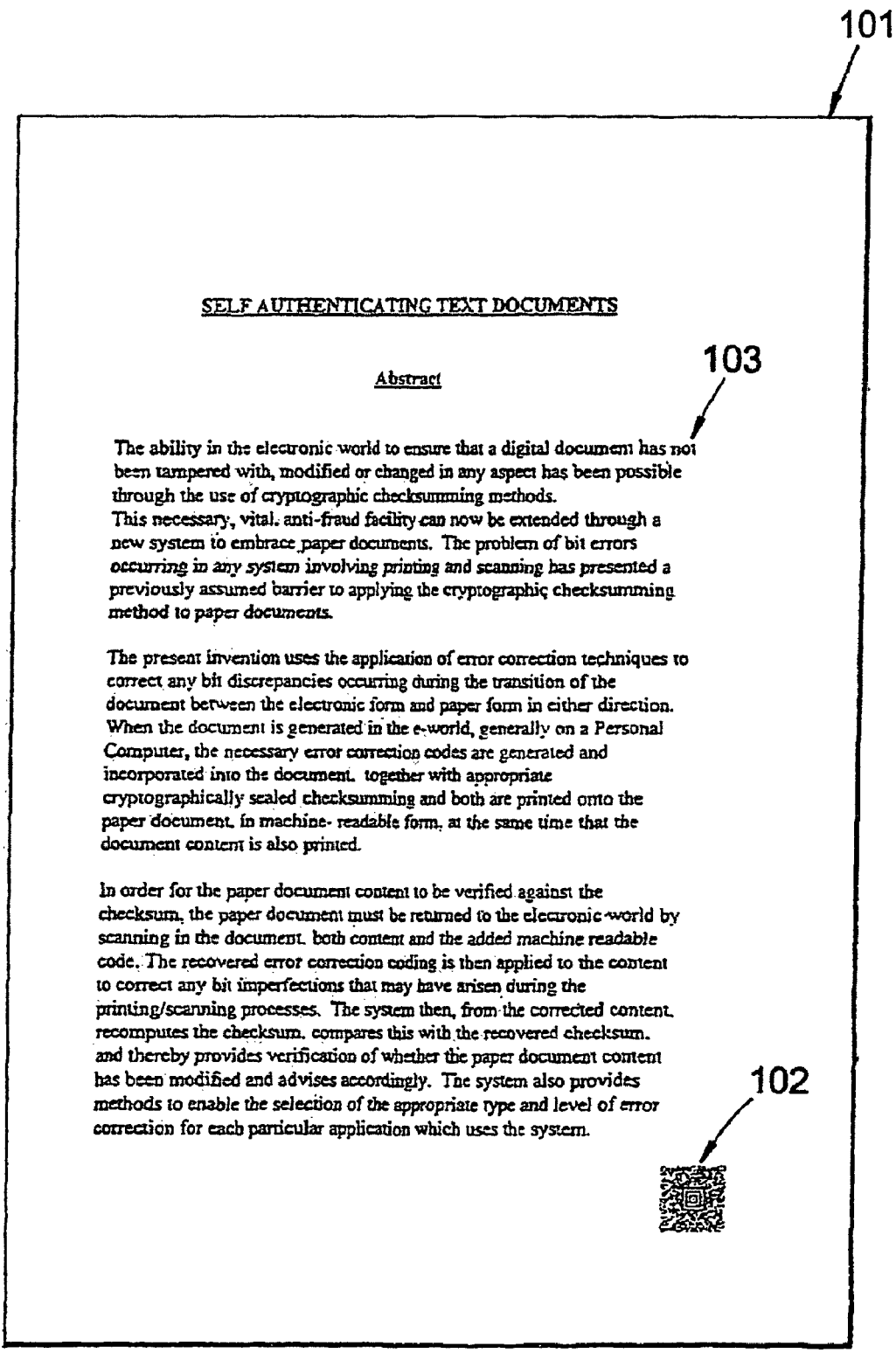
FIG. 1 shows a page of text data with an example of a symbol in accordance with the invention.

FIG. 1 shows a page 101 of text data 103 together with an example of a coded symbol 102 comprising a hash total, and error correction coding. Additional security may be included in the symbol if it is required by a particular application.

Figure 2:
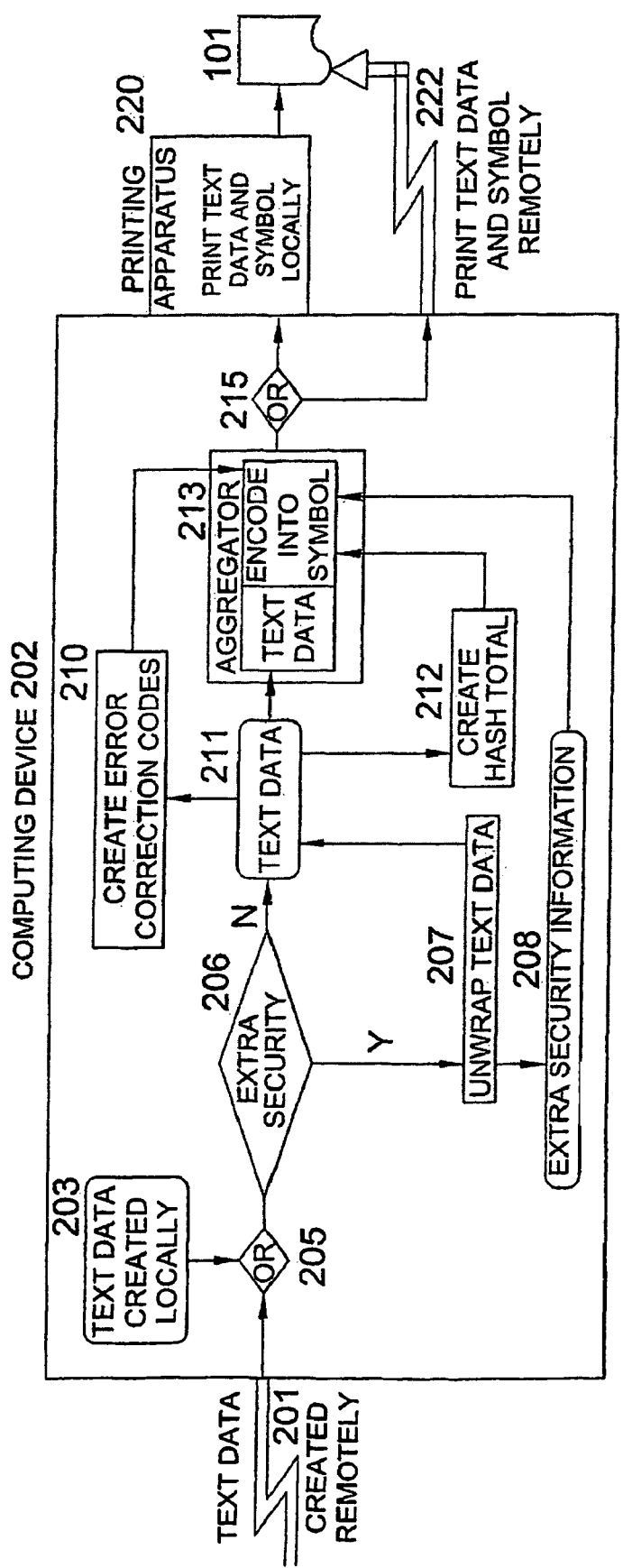
FIG. 2 is a process flow diagram showing a document creation procedure according to the invention.

FIG. 2 illustrates the creation of a document such as document 101 within a computing device 202. As part of this procedure, the symbol 102 is created and applied to the document 101. The text data 103 may be created within the computing device 202, as illustrated by the local text source 203, or at an external text source 201 and channelled through gate 205. If the electronic document has been subjected to added security such as digital signature then, as shown in decision box 206, this is unwrapped and separated in step 207 from the text data. Dependent on the nature of this security, which, if present, is application specific, the extra security information 208 would be included in the symbol in step 213.

The text data 211 is then subjected to two processes 210 and 212. In step 210 a predetermined level and type of error, correction codes are generated from the text data 211 and routed to the aggregating process 213 for inclusion in the symbol. To accomplish this, the text data is divided into stings of length k characters. The text data will not usually be an exact multiple of k and consequently a series of blanks is added to the last standing. For each string an error correction block length d bytes will be computed. The string length k and the amount of error correction d to be applied are determined a priori on an application by application basis.

In the process 212, a hash total for the total text data is generated; the particular hashing security is user selected as deemed suitable for the application and routed to the aggregating process 213, for inclusion in the symbol.

In the case of multipage documents, the process allows the hash total for each page to be included in the symbol, together with the necessary error correction codes and a page numbering method to be added to the symbol; alternatively merely a final checksum could be coded, thereby allowing flexibilty to suit the application. The printing of the document can be performed by the printing apparatus 220 or on a remote printing system 222 either at the time of adding the self-authenticating symbol, to the paper document 101, or later.

In the embodiment of FIG. 2, the computing device 202 comprises a personal computer configuration of processor, keyboard, display screen, RAM etc. with a printer attached. Other embodiments which produce the equivalent functionality are possible, and, in particular, it is not essential that the computing device 202 includes or is attached to a printing apparatus; not only because the printing can be physically remote (as described above) but also because it can be performed subsequently or even may only be utilised in some cases, or under certain conditions.

Figure 3:
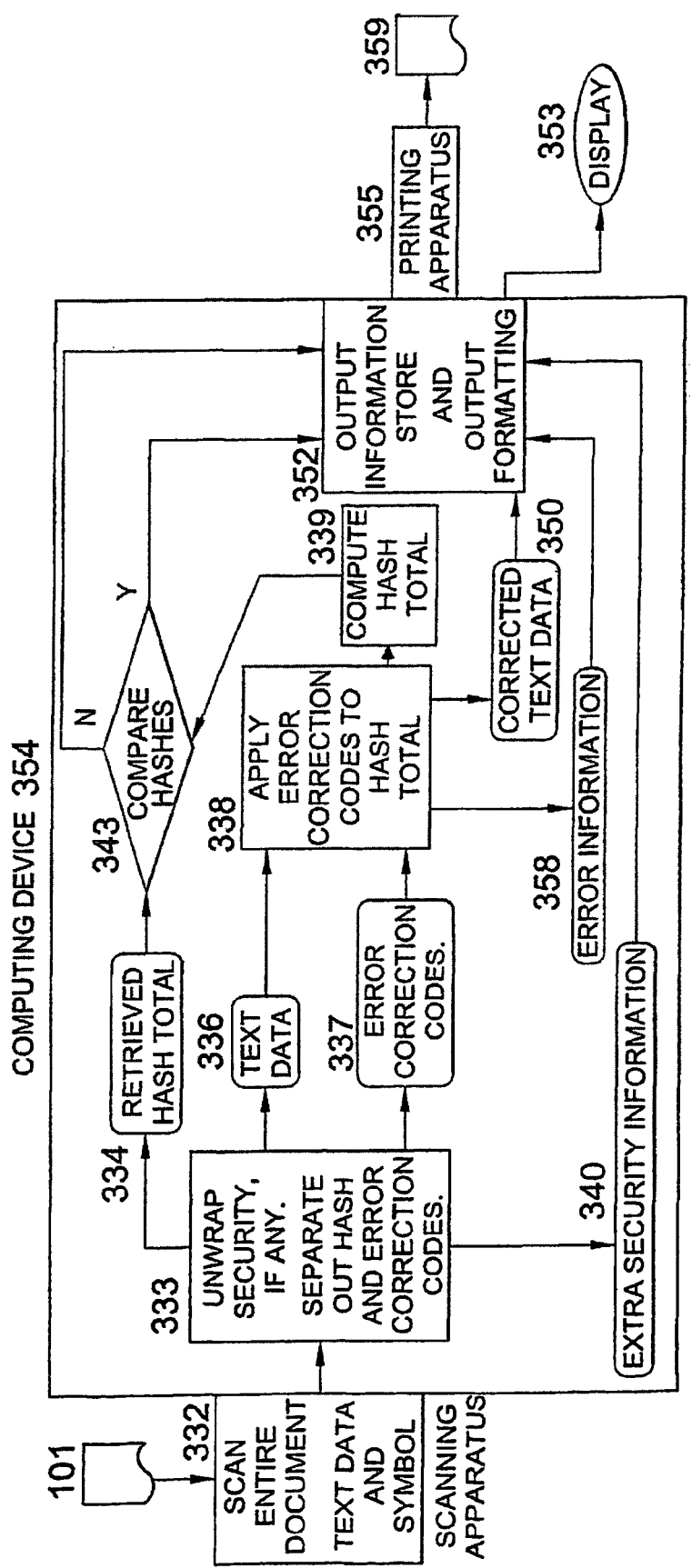
FIG. 3 is a process flow diagram showing a document authentication procedure according to the invention.

FIG. 3 illustrates a procedure by which the printed document 101 is authenticated in accordance with the invention. It shows the document 101 being scanned by a scanning device 332, which is connected to a computing device 354 comprising an output information store 352. In this case, the computing device 354 is a different device to the one 202 used for printing in FIG. 2; however, there is no reason why it could not be the same device. In process step 333 the security wrapping, if present, is removed. Dependent on the security employed, this may be performed by use of a public key (the match of the document creator's private key). Certain enhancements, well known to those skilled in the art, can also be optionally employed for greater assurance. For example, the symbol 102 can include digital certificates for public key distribution to parties that do not know the public key needed to verify a symbol encrypted by the private key used. In this certificate the device public key is encrypted and vouched for by the private key of a trusted certifier whose public key is known to the recipient of the document or whoever is trying to authenticate the document. The certifier's public key is used to decrypt the public key needed to extract the other information in the symbol 102 and verify that the data text on the document is authentic. Alternatively, it is possible to allow the extraction of the relevant public key from a publicly accessible database eliminating the need for digital certification. Thus it can be seen that the invention offers wide applicability by various methods from those appropriate to closed user groups, to use by the general public.

There exists a route, for extra security information 340, to be channelled to the output information store 352.

The symbol data is decoded in step 333. If the extra security was employed in the document creation, then the retrieved hash total 334 and the error correction codes 337, having been decrypted are processed at steps 343 and 338 respectively. The text data 336 is also processed at step 338.

The error correction codes 337 extracted, and if necessary decrypted, from the symbol 102 in step 333 are then applied in step 338 to the text data 336.

In step 338, the first string of k text data characters k(1) has the first module of d error correction codes d(1) applied to correct any bit imperfections that may have arisen in the printing/scanning processes. Then the second string k(2) has its relevant error correction module d(2) applied and the process continues until all of the document 101 has been so treated.

If, in the error correction process, text data string k(n) cannot be checked or corrected by the application of error correction module d(n), then a document discrepancy has been detected. This may be resulted from the printed text data string k(n) on paper having been changed; say by damage to the document or by deliberate unauthorised alteration. Unauthorised insertion or deletion of text data will have a similar effect. In such cases the error correction modules may need to be brought back into synchronisation with their relevant text data strings to allow the remainder of the document to be corrected.

Correction makes use of a realignment scrolling routine as follows. The text data string k(n) is advanced character by character as error correction is applied by modules d(n) through d(n+p). The character by character advance in the text data is now repeated (p+1)k times, thus being applied to the next p text data strings.

The selection of the appropriate parameters is application specific and controls the extent to which the above method is performed to attempt error correction throughout the remainder of the document. The setting of this parameter is determined in conjunction with, and in relation to, the customising of the process by the method for setting the parameters k and d, as described later. The hash totalling/checksumming process used also needs to be taken into consideration when selecting these parameters.

Step 338 will generate flags and indicators evidencing what has taken place, where errors were detected and whether they were corrected, all this information 358 is passed to the output information store 352. The corrected text data 350 is also passed to the information store 352, which performs output formatting as required by the application. The corrected text data created in step 338 is then used in step 339 to compute a hash total, which is now compared in step 343 with the hash total 334 previously extracted from the symbol in step 333.

The result of the comparison is conveyed to the output information store, to be processed as the application requires. Because of the diverse potential applications in which the invention can be embodied, considerable user flexibility is available for the output information store 352 to exhibit results and backing information either by printing output 359 on a printing device 355, or on a display screen 353 but is not limited only to these. Dependent on the outcome of the document authentication, different messages, not only about the result, but also about security errors, additional flagging of corrected errors, the corrected text data or whatever combination is appropriate to the application, can be selected.

Customised calibration of the type and amount of error correction allows the invention to be employed across different types of document and with a variety of equipment, in particular scanning devices.

Figure 4:
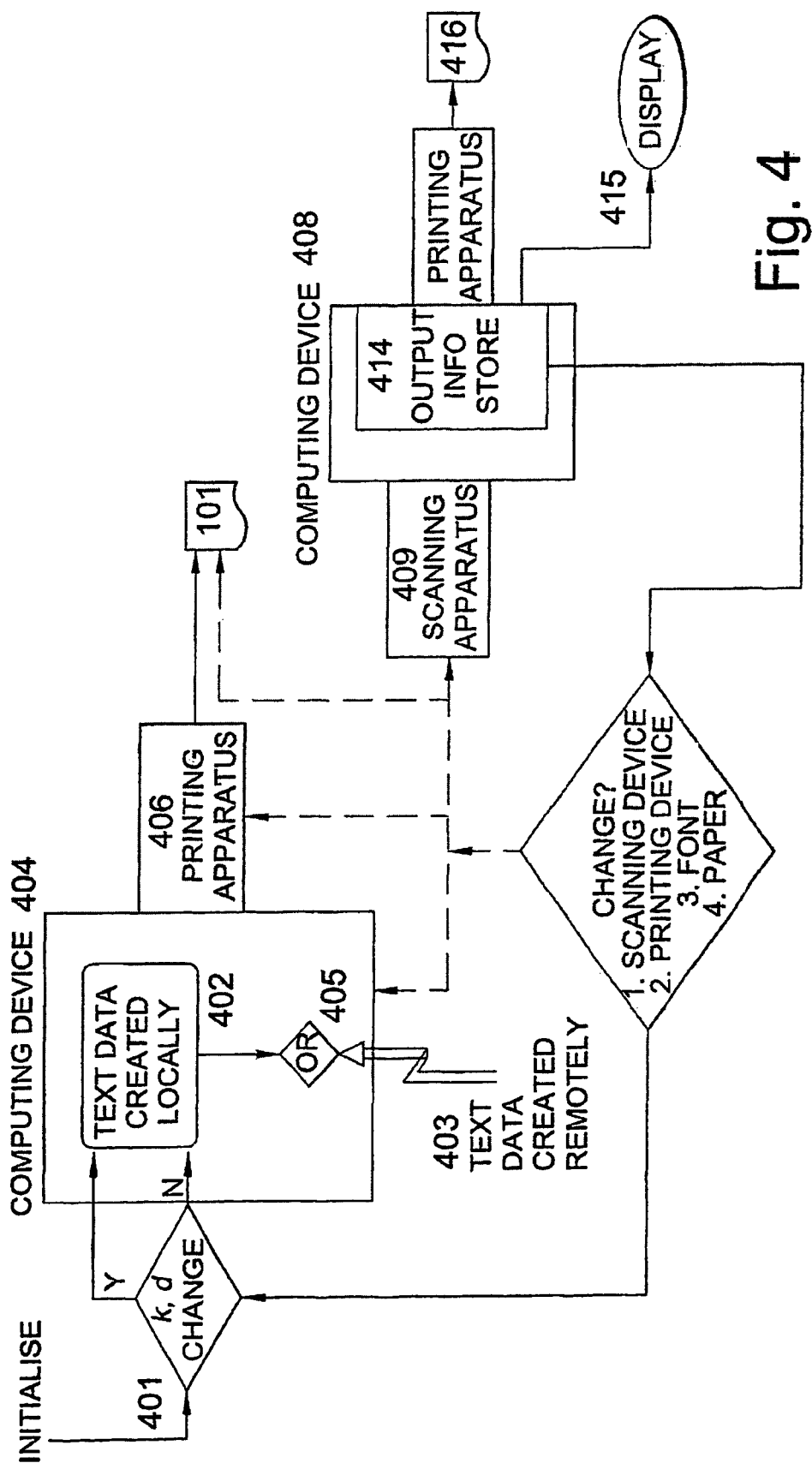
FIG. 4 is a process flow diagram illustrating a process in accordance with the invention, by which a user can determine the appropriate level of error correction to be employed in a given application appropriate to the physical apparatus used and level of security targeted.

FIG. 4 illustrates a further embodiment of the invention which is particularly susceptible to use modification. In this regard, it is possible to vary the string length k of text data, to which an amount of error correction d is applied. In this particular embodiment, the type of error correction coding used is again Reed-Solomon. An initial setting of k and d are selected, or the default option allowed and applied from 401 to text data created locally 402 in computing apparatus 404 or at a remote source 403 and received via gate 405. Printing apparatus 406 is then used to print a document 101, which has been taken through the steps discussed in the associated description to FIG. 2. The document 101 is then authenticated by a computing device 408 with a scanning apparatus 409 according to the steps discussed in the associated description to FIG. 3. From the output information store 414, results and statistics are produced on screen or printed with printing apparatus on paper 416 as a succession of documents pass through the processes. Changes can be effected for 1) different scanning apparatus 2) different printing apparatus
3) font (size and type)
4) paper and further information gathered. As a consequence, k and/or d can be changed until the settings are deemed appropriate to each particular application since the sensitivity and susceptibility of the text data to fraudulent change will be application specific.

The encoding and decoding processes employed in the document creation and authentication procedures discussed above will now be described in more detail with reference to FIG. 5.

The text in a document is typically stored in a computer as an ASCII value, which is 8 bits long (including the parity check). The above-described embodiments of the invention, this value is used to convert the character into a field element using field $F_{2^8}$. Before encoding a passage of text, the corresponding list of elements in this field is first constructed. This list is broken into message blocks and encoded as illustrated in FIG. 5.

In this process Reed-Solomon (RS) code is employed, although other types of coding are viable. The parameters of the RS code to be used are defined by specifying k and t=(d−1)/2. A more direct, but more mathematically complex process (where k and d are specified) could be used as an alternative, if preferred. The number of characters (t) that can be corrected per message block (k) is set and the whole text is then encoded, k characters at a time. The last message word in the document is padded with 0's if necessary to make it of length k. If $$m=(m_0, m_1, m_2, \ldots, m_{k-2}, m_{k-1})$$

is a message word encoded as $$m=(m_0, m_1, m_2, \ldots, m_{k-2}, m_{k-1}, e_0, e_1, e_2, \ldots, e_{2t-2}, e_{2t-1})$$

then $(e_0, e_1, e_2, \ldots, e_{2t-1}, e_{2t-1})$ (hereafter referred to as error correction bytes) is stored somewhere (e.g. in a file). The reason that $m=(m_0, m_1, m_2, \ldots, m_{k-2}, m_{k-1})$ is not stored is because they will still be present (at least for the most part) on the printed document. If the entire document is N characters long, this involves storing $$\left\lceil \frac{N}{k} * 2r \right\rceil$$

extra bytes of information. For a sufficiently large document, this is roughly equal to 2t*N/k. These bytes are stored in the 2D symbol 102 that will be printed on the same page as the text of text document.

The encoding process described above is implemented as follows. At the lowest level, elements are represented and operations performed over $F_{2^8}$. Field elements are essentially polynomials (in α, say) of degree <8 with binary coefficients. The binary representation of a message character's ASCII value can be viewed as such a polynomial. For addition it is required to add the polynomials mod 2. This is bitwise XOR of the ASCII values. Multiplication in this field is not the standard multiplication. The corresponding polynomials have to be multiplied (mod 2) and the result to be reduced modulo a $8^{th}$ degree polynomial irreducible over $Z_2$. This can be programmed relatively easily, as can functions to get powers (including inverses) of field elements, all of which are needed. This embodiment of the invention uses a more efficient process, however. Taking the discrete log (to the base of some generator) of the field elements, multiplication becomes addition (not XOR) of powers (getting inverses and raising to a power is also simpler). While a discrete log approach is unfeasible for large fields, this field is sufficiently "small" that the entire log table can be constructed in a once off calculation. A table that translates a power of the generator into a field element is also calculated at the same time. As well as being more efficient, this makes for much simpler programming.

Hashing, as known to those skilled in the art, is a mathematical transformation which creates a unique fixed length representation of an indefinite length value such as a string of text. By analogy, DNA is a compact structure that is a unique representation of particular individual that can be used as a unique identifier of the much larger and complex person, so the hash value performs an analogous function for the text string. One way hashes ensure that the process cannot be used in the reverse direction, and so provide foolproof fraud protection. This embodiment of the invention allows additional security to be incorporated into coded symbols and similarly can support corroboration of key items of text or data in the document, provide PPK elements, to allow non repudiation of time, point of origin and originator, or whatever other security features need to be employed.

The specific decoding algorithm employed in this embodiment is the Modified Extended Euclidean Algorithm. This algorithm is relatively simple, and the division algorithm for: polynomials (over $F_{2^8}[x]/<x^n-1>$) is already employed for encoding. The algorithm uses the syndrome polynomial to find both the error locator polynomial and the error evaluator polynomial. The locations of the errors are not limited to the n' elements of the received word. It is entirely possible for a length n' word to be decoded as a length n'+1 (or longer) word since this is a truncated code. This will be a misdecode as valid codewords can be no longer than n', and the decoder will spot this. It is still possible to salvage the text from such a misdecode. The decoder can be considered a black box, which takes as input a polynomial of degree <n' over $F_{2^8}$ (or words of n' ASCII values, which is how they will be subsequently referred to), and either returns the correct codeword and how many errors had to be corrected or fails (if there were too many errors).

Figure 5:
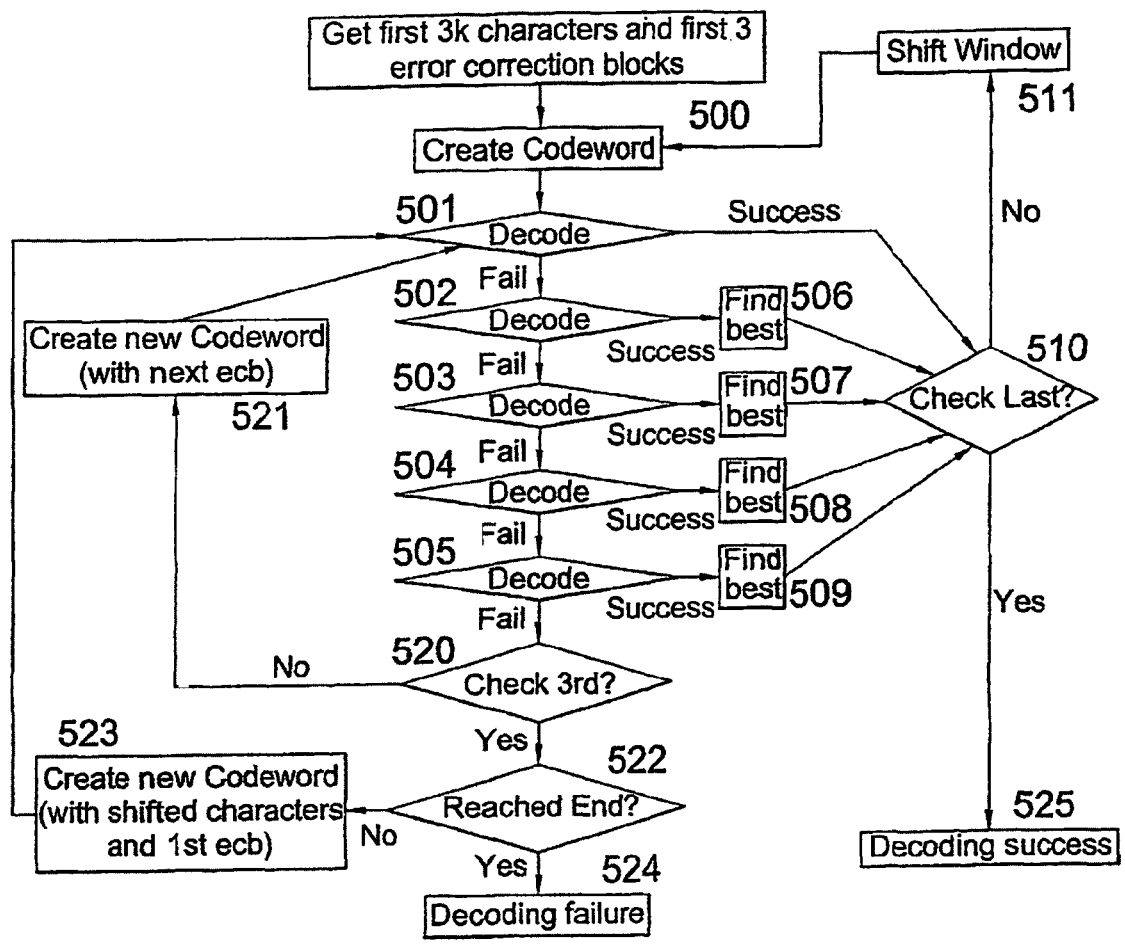
FIG. 5 is a flow diagram illustrating how error correction codes are applied in the decoding process.

FIG. 5 illustrates how text modifications are addressed. As well as containing the error correction bytes, the 2D symbol 102 also contains the values for k and d (these values have to be read in because they can be varied to provide more/less protection). The program reads these, then selects k characters from the scanned file and concatenates d−1 bytes from the 2D symbol. This is the first received word, and is passed to the decoding function. If decoding fails, it is because there have been more errors in the word than the t it is able to correct. When this happens, the received word is subjected to all possible single character deletions, and each modified word is sent to decode. A greedy search would work quicker, but it is preferred to attempt all possibilities and select the best (word with least errors) to be corrected. This is because, more often than not, a greedy search will get within t places of where the extra character occurred and the decode function will correct the remaining characters. Later on it will be necessary to know the exact location where the error happened.

By performing decode on various modified codewords the likelihood of misdecodes is increased, but not as much as if the code were cyclic (which it is not). If the code were cyclic, then in the situation where a whole word is shifted one position (say the first symbol was missing), the decoder would simply change the last symbol (which is actually the first symbol from the next word) to the deleted symbol, thereby creating a cyclic shift of the original codeword which would also be a codeword. Cyclic code does, however, have the advantage that the message symbols and error correction symbols are separated. If in transit there is a deletion in the message, the error correction symbols will remain unaffected. Therefore at most k of the symbols will be shifted. Indeed, considering that the 2D symbol 102 has inherent error correction, the d−1 error correction symbols can be considered reliable. Another advantage of this embodiment is that it provides an extra ASCII parity check bit. All decoded codewords are checked to make sure they have valid ASCII values. This misdecodes even less likely since at least d message symbols have to be changed after decoding (code has min distance d) and each has only a ⅜ (96 out of 256) probability of being a printable ASCII character. For example, in a distance 7 code, only one in a thousand misdecodes will pass this test (misdecodes themselves are very rare). This extra redundancy could be removed in favour of increasing the rate of the code, but given the efficiency of 2D symbology, and the fact that only the error correcting symbols are entered, one can be generous in this regard. Furthermore, as has been previously stated, it is possible for a misdecoded word to have "corrections" outside the n' elements of accepted codewords (this being a subset of a larger code). On the basis that such positioning is random, and using the default parameters (k=30 and d=7), it can be established that less than one in a million misdecodes will have the "corrections" in the appropriate places (even assuming that the error correction bytes are unreliable).

The foregoing process corrects the text when a character has been inserted in error. Characters that have been deleted from the original text are handled in a similar but converse way. An asterisk ("*") is inserted into the word at various places (shifting the text along, not replacing it) before the word is passed to decode. Again there is a complete search rather than a greedy one. However, it is not necessary to apply the search over both cases. It is greedy in the sense it will only try inserting characters if deleting characters does not work.

These processes do correct most errors that appear in scanned documents, but not all. Occasionally more than one insertion or deletion will occur in one codeword (especially in the case of deliberate alterations). While the search for one inserted or deleted character only requires 2k executions of decode, a search for 2 would require of the order of $k^2$. However if it is only required to delete/insert pairs of characters that are mutually adjacent, then this is reduced to 2k searches. Most occurrences of 2 deletions/insertions tend to be mutually adjacent, and if they are not, then at least the subsequent codewords can be decoded. It is very unlikely that 2 characters will be missing from the text but that the surrounding text will be unaffected. This means that if there are two characters missing, both asterisks and at least one other character will have to be corrected. So for this to be worthwhile, the code is set to be at least 3 error correcting (or distance 7).

Returning a printed document to the electronic domain by scanning allows for the correction of resulting channel noise errors, provided that the original document has been treated in accordance with the invention. Thus the original document can be recreated.

While the foregoing approach caters for correction of errors caused by noise, deliberate insertions/deletions are unlikely to be limited to just one or two characters. Any implementation would not necessarily want to correct improper/fraudulent change but it may be desirable to be able to retrieve as much of the remaining document as possible.

The first step in this procedure is an exhaustive search. Once a received word has failed all the above attempts to decode, then that word is marked as the first place of a window that will be shifted along the rest of the text. Not only is the piece of text in the window decoded with the original error correction symbol, but the subsequent error correction symbols are also tried. While one could use all the above methods (insertions/deletions) to look for decodeable words, to save time only the basic decode is used (this reduces complexity by a factor of k). It has been found sufficient to look at 3k message symbols and 3*(d−1) error correction symbols to recover from reasonable errors. A data flow diagram describing the entire decoding process which takes place in step 338 is illustrated in FIG. 5.

The total text data and error correction codes are thus dealt with in the decode process in blocks of 3k characters and 3 associated error correction block (i.e. 3(d−1) error correction bytes).

The step 500 selects blocks of k characters from the scanned text file and concatenates the associated (d−1) bytes of error correction codes obtained from the 2D symbol. This becomes the codeword which is then decoded in step 501. If this succeeds, then in step 510 it is tested to see if it is the last codeword.

If not then in step 511 it is determined if the next blocks of 3k characters and 3 error correction bytes are required. In that case, these are made available to step 500. In step 500 the next codeword is created. If the next block is not needed then the next codeword is created in step 500 from next k text characters and (d−1) error correction codes available.

This codeword is decoded in step 501 and the above process is repeated, provided that success in decoding is maintained, until the test step 510 for end of document shows that to be the case and the decoding success information is available in step 525 for whatever action is appropriate to the specific application.

In the event of a decode failure in step 501, decode of the codeword is attempted with a single deletion, where this is applied in all possible positions for single character deletions. If successful, the results are passed to step 506, which determines the best position of the deletion, being that giving the fewest errors. A check is then taken in step 510 to see if this is the last codeword. If so, then conclude success in step 525 and if not, the process described previously in step 511 is repeated.

If the decoding fails in step 502 then the same process is applied to decoding now with the insertion of a single character in step 503. If successful, then step 507 selects the optional position for the insertion as step 506 did for the deletion, and the end of the document test step 510 is applied as previously.

Failure with single character insertion leads to attempting the similar processes for two deletions in steps 504 and 508 and then for two insertions in steps 505 and 509.

If these do not succeed then in step 520 a check is made to see if this is the third error correction block and, if not, create a new codeword with the same characters and the next error correction block. If it is the third, then in step 522 a check is made to identify if the end of the document has been reached. If not, then in step 523 a new codeword is created with the text characters shifted one place with the appropriate error correction block.

The new codewords resulting from steps 521 and 523, get decoded in step 501 and in each case the whole process described above is entered into again.

If the step 522 which checks the end of the document shows this to be the case, then the decoding has failed and step 524 is invoked, which takes action as determined by the specific application.

The above described embodiments of the invention offer significant flexibility in operation in different applications. There is independence in terms of what type of symbology is employed for the machine readable symbol, what cryptographic methods may be utilised, what additional security features may be incorporated and what printers and scanners may be used. Their use in integration and extension in systems which may require production of self-authenticating paper documents is thus unconstrained.

A key aspect of the invention is that the document creation process may occur externally to the hardware and software apparatus necessary to add the machine-readable symbol to the paper document. The electronic text data document may have been originated not only at a different physical location but at some previous time. The invention may, in some applications, only be utilised at the time when it is necessary to print the document onto paper with the self-authenticating machine readable symbology added.

Fraud involving printed documents is mainly accomplished through a) duplication, b) counterfeiting, or c) alteration of text data on the document. Duplication may in many cases not present a fraud opportunity, but when such occurs it is normally countered by control systems or use of specialised secure paper techniques complementary to the invention. Counterfeiting can be detected by established special paper characteristics, such as watermarking, which can be used in conjunction with the invention. However, the critical problem is alteration of the text data on a document; this can now be resolved by application of the invention.

To cater for the wide range of potential applications of the invention, inevitably utilising different hardware, fonts, etc., changes can be made to the key parameters involved in the processes described above.

While the preferred embodiment of the invention have been described herein, it is to be understood that the invention is not limited to these and modifications of the embodiment described may become apparent to those of ordinary skill in the art, following the teachings of the invention without departing from the spirit or scope of the invention as set forth in the appended claims.

The invention claimed is:

1. A method of producing a self-authenticating document containing printed text having the capability that the entire content of the printed text can be authenticated by reference to the document, the method comprising:
   providing electronic text which is intended to be contained within the document as printed text;
   generating an electronic text verification value, representative of the entire content of the said electronic text;
   generating one or more error correction codes for the said electronic text, said one or more error correction codes being adapted to enable the correction of digitization errors of said printed text; and
   generating a machine-readable symbol, representative of the said text verification value and the said error correction code or codes;
   wherein the machine-readable symbol is adapted for incorporation within the document when it is printed.

2. A method according to claim 1, comprising the further step of printing the said self authenticating document in such a manner that it comprises the said electronic text as the printed text and the said machine-readable symbol.

3. A method according to claim 1, wherein the said verification value comprises a hash total.

4. A method according to claim 1, wherein the said verification value comprises a checksum.

5. A method according to claim 1, wherein the said electronic text is divided into a predetermined number of strings and an error correction code is determined for each respective string.

6. A method according to claim 1, wherein said error correction code is a Reed-Solomon code.

7. A method according to claim 1 wherein the said machine-readable symbol comprises security data.

8. A method of verifying a printed document, comprising:
   machine-reading printed text on the printed document to produce digitized text and machine-reading a symbol printed on the printed document;
   deriving one or more error correction codes from the said symbol;
   using the error correction code or codes to perform an error correction operation on the said digitized text to correct for digitization errors;
   deriving a verification value representative of the entire content of a predetermined body of text from the said symbol;
   deriving a further verification value from the said digitized text after it has been subject to the correction operation; and
   comparing the said further verification value with the said verification value derived from the said symbol.

9. A method according to claim 8, wherein the said printed text and symbol are read using an optical scanner.

10. A method according to claim 8, wherein the said verification value comprises a hash total.

11. A method according to claim 8, wherein the said verification value comprises a checksum.

12. A method according to claim 8, wherein the digitized text is divided into a series of strings and a said error correction code is associated with each respective said string.

13. A method according to claim 8, wherein the or each said error correction code is a Reed-Solomon code.

14. A method according to claim 8, wherein the said symbol comprises security data and the said method comprises a step of using the said security data in order to extract information contained within the said symbol.

15. A device for producing a self-authenticating document, the said device being adapted to provide electronic text to be recorded on the said document as printed text; to generate an electronic text verification value representative of the entire content of the said electronic text; to generate one or more error correction codes for the said electronic text, said one or more error correction codes being adapted to enable the correction of digitization errors of said printed text; and to generate a machine-readable symbol representative of the said text verification value and the said error correction code or codes, which symbol is adapted to be incorporated in the document when it is printed.

16. A device according to claim 15, comprising a printer.

17. A device for verifying a self-authenticating printed document, the said device being adapted to machine-read printed text on the printed document to produce digitized text and to machine-read a symbol contained within the said printed document, to derive one or more error correction codes from the said symbol, to apply a correction operation to the said digitized text using the said error correction code or codes so as to correct for digitization errors of said printed text, to derive a verification value representative of the entire content of a predetermined body of text from the said symbol, to derive a further verification value from the said digitized text after it has been subjected to the said error correction procedure; and to compare the said verification value with the said further verification value.

18. A device according to claim 17, comprising an optical scanner.

* * * * *